United States Patent [19]

Forrest

[11] Patent Number: 4,531,478
[45] Date of Patent: Jul. 30, 1985

[54] ANIMAL HOLDING CHUTE

[76] Inventor: William J. Forrest, 3400 N.W. Expressway, Oklahoma City, Okla. 73112

[21] Appl. No.: 620,631

[22] Filed: Jun. 14, 1984

[51] Int. Cl.³ .......................... A01K 15/00; A61D 3/00
[52] U.S. Cl. .......................................... 119/98; 119/99
[58] Field of Search .............................. 119/27, 98, 99

[56] References Cited

U.S. PATENT DOCUMENTS

| | | | |
|---|---|---|---|
| 882,647 | 3/1908 | Nelson | 119/99 |
| 902,998 | 11/1908 | Phillips | 119/99 |
| 1,436,148 | 11/1922 | Burris | 119/99 |
| 1,436,897 | 11/1922 | Novak | 119/99 |
| 3,195,513 | 7/1965 | Billhorn | 119/99 |
| 4,432,305 | 2/1984 | Vernese | 119/98 |
| 4,444,150 | 4/1984 | Hueftle et al. | 119/98 X |

Primary Examiner—Robert P. Swiatek
Attorney, Agent, or Firm—Dunlap & Codding

[57] ABSTRACT

An animal holding chute with a retaining frame retainingly surrounding an animal holding space having an entrance formed through a portion thereof, the entrance being sized and position for permitting an animal to pass therethrough and into the animal holding space. An entrance gate is positioned in the entrance and the entrance gate is movable to an opened position for permitting access to the animal holding space through the entrance and to a closed position for preventing an animal to pass from the animal holding space through the entrance. The entrance gate also is movable in the closed position from a start position to an animal holding position, the entrance gate engaging the rear end portion of the animal and moving the animal into the animal holding space as the entrance gate is moved from the start position to the animal holding position.

33 Claims, 15 Drawing Figures

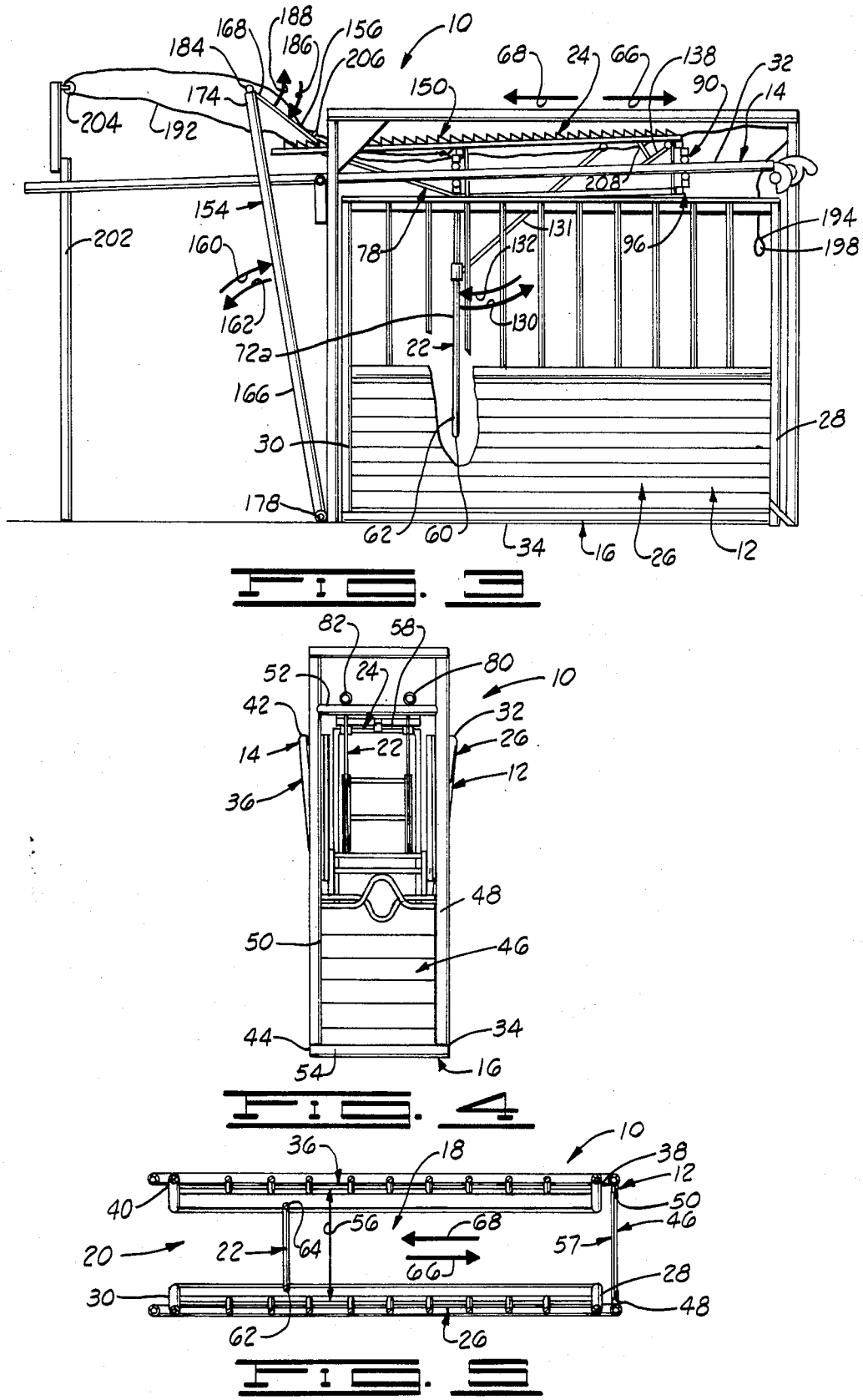

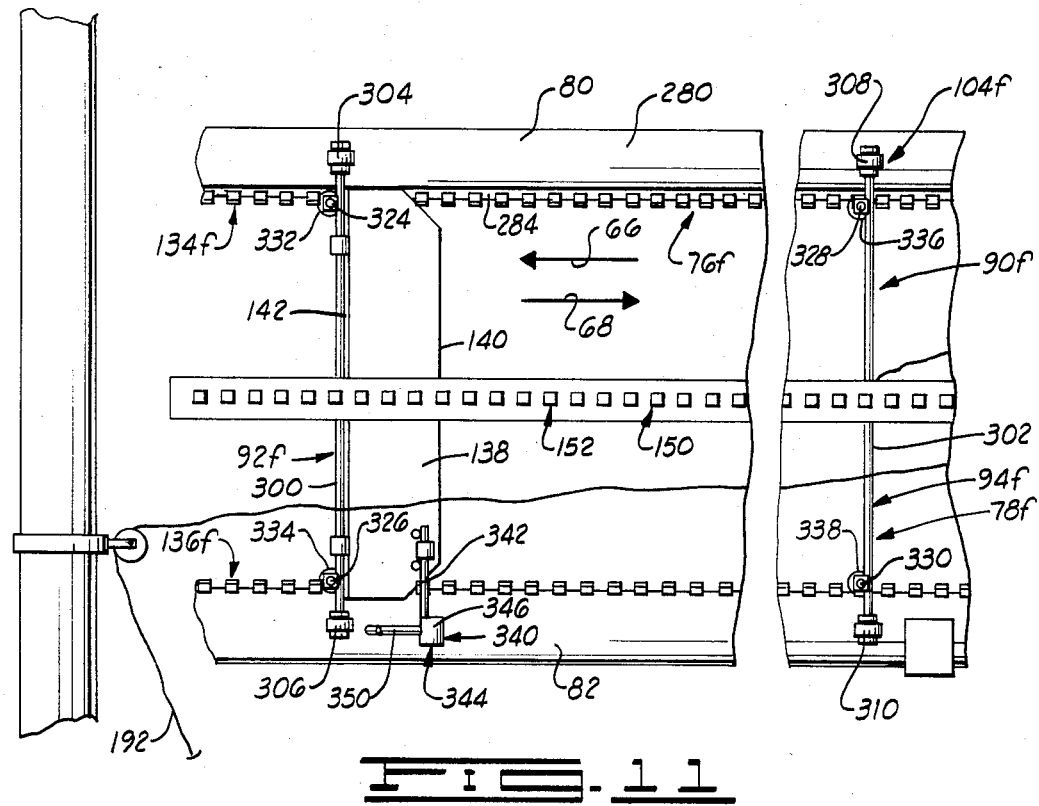
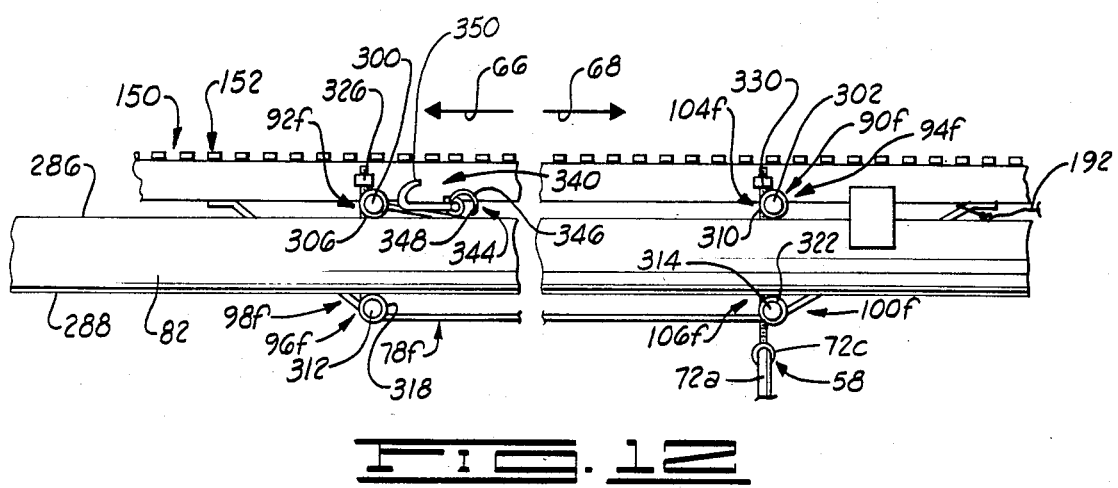

ANIMAL HOLDING CHUTE

BACKGROUND OF THE INVENTION

Field of the Invention

The present invention relates generally to animal holding chutes and, more particularly, but not by way of limitation, to an animal holding chute having a movable entrance gate for moving the animal into an animal holding space and for cooperating to retain the animal in the animal holding space.

BRIEF DESCRIPTION OF THE DRAWINGS

FIG. 3 is a first side frame elevational view of the animal holding hute.

FIG. 4 is an exit end elevational view, showing the forward side frame of the animal holding chute of the present invention with the arm assembly being omitted.

FIG. 5 is a top plan view of the animal holding chute of FIG. 1, with the gate support and the arm assembly being omitted.

FIG. 11 is a plan view showing a portion of a modified carriage for supporting the entrance gate and showing blade release for engaging and disengaging the carriage blade.

FIG. 12 is a side elevational view showing the modified carriage and blade release of FIG. 11.

DESCRIPTION OF THE PREFERRED EMBODIMENTS

Figure 1:
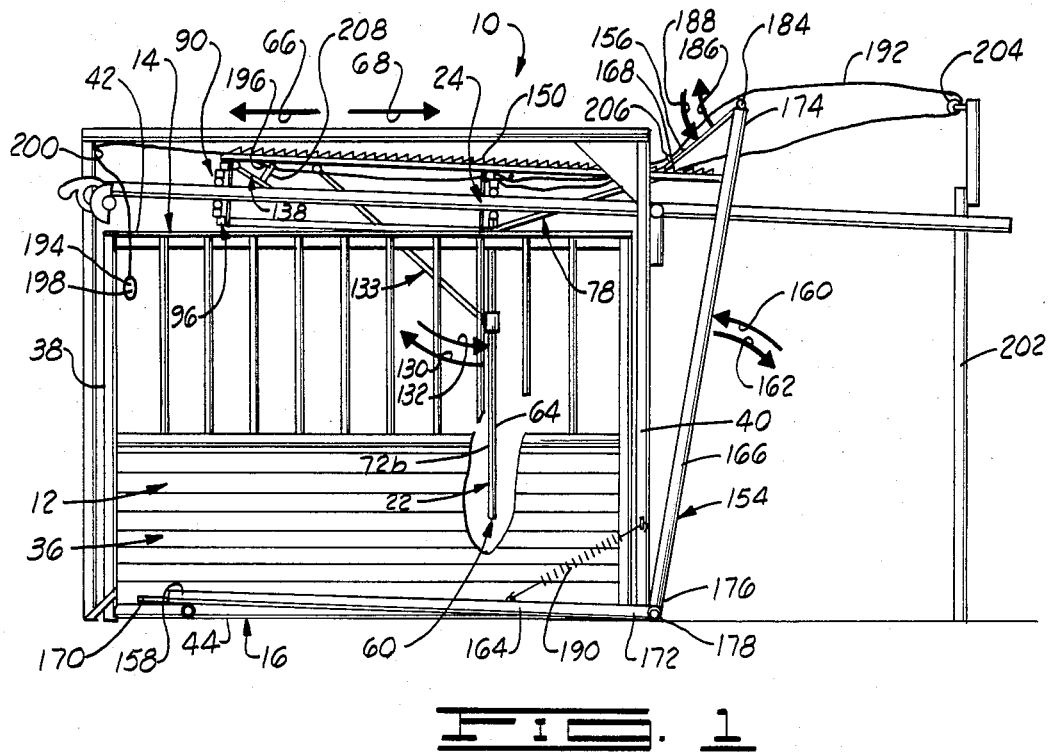
FIG. 1 is a second side frame elevational view of an animal holding chute, which is constructed in accordance with the present invention and includes a retaining frame, an entrance gate and a gate support.
Figure 2:
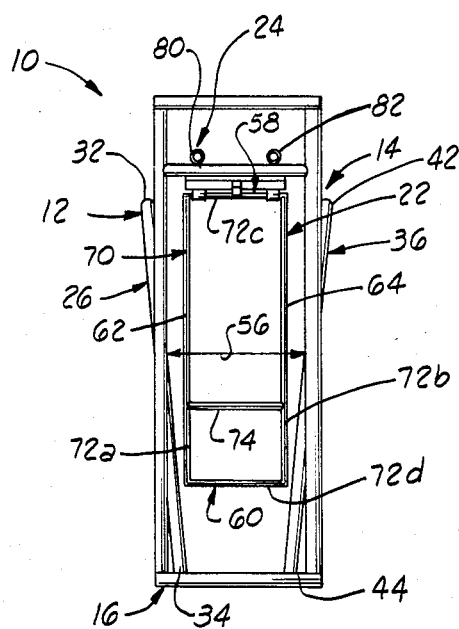
FIG. 2 is an entrance end elevational view of the animal holding chute of FIG. 1, showing the entrance gate supported on the retaining frame by the gate support, with the forward side frame and the arm assembly being omitted.

Referring to the drawings in general and to FIGS. 1, 2, 3, 4 and 5 in general, shown therein and designated by the general reference numeral 10 is an animal holding chute which is constructed in accordance with the present invention. The chute 10 basically includes a retaining frame 12 having an upper end 14 and a lower end 16 and retainingly surrounding an animal holding space 18, an entrance 20 which is formed through a portion of the retaining frame 12, an entrance gate 22 which is sized and shaped for substantially closing the entrance 20 in one position of the entrance gate 22, and a gate support 24 which is connected to the upper end 14 of the retaining frame 12 and which is connected to a portion of the entrance gate 22 for movably supporting the entrance gate 22 generally within the entrance 20. The entrance 20 is in communication with the animal holding space 18, and the entrance 20 is sized and shaped to accommodate an animal passing therethrough and into the animal holding space 18. The animal holding space 18 is sized and shaped for accommodating an animal and the retaining frame 12 cooperates to retainingly hold an animal within the animal holding space 18. The entrance gate 22 is movably supported by the gate support 24 for movement to and from an opened position and a closed position and for movement to and from a start position and an animal holding position.

In operation, the entrance gate 24 is movably supported within the entrance 20 and an animal (a cow) is moved into position generally in front of the entrance gate 22 for entrance into the animal holding space 18. The entrance gate 22 is moved to the opened position thereby providing access to the animal holding space 18 through the entrance 20 and the animal moves through the entrance 20 and into the animal holding space 18. After the animal has entered the animal holding space 18, the entrance gate 22 is moved to the closed position and, in the closed position, the entrance gate 22 substantially closes the entrance 20 and prevents the animal from leaving or passing from the animal holding space 18 through the entrance 20. When the entrance gate 22 initially is moved to the closed position, the entrance gate 22 also is supported by the gate support 24 in the start position and, then, the gate support 24 is moved from the start position to the animal holding position. As the entrance gate 22 is moved from the start position to the animal holding position, the entrance gate 22 engages the rear end portion of the animal and moves the animal into the animal holding space 18. In the animal holding position of the entrance gate 22, the animal is substantially surrounded by the retaining frame 12 with the retaining frame 12 being disposed near and spaced a relatively small distance from the animal and the entrance gate 22 is positioned generally adjacent and engaging the rear end portion of the animal.

Animal holding chutes, sometimes referred to in the art as "squeeze chutes", in a variety of forms have been constructed and used in the past for confining an animal within a defined space so various operations can be performed on the animal. These prior animal holding chutes have included a retaining frame and some of these prior chutes have included a retaining frame which was constructed exactly like the retaining frame 12, except as the retaining frame 12 is adapted to accommodate the gate support 24 for supporting the entrance gate 22. In these prior chutes, the animal was pushed, prodded, pulled or otherwise moved through an entrance into an animal holding space and a clamp was secured about the animal's neck, the clamp being sized so the animal could not pull its head therethrough in the clamped position and the clamp thereby retaining the animal within the animal holding space by securely retaining the animal's head. When the operations were completed, the clamp was released and a portion of the retaining frame was opened to provide an exit so the animal could leave or pass from the animal holding space through the exit to make room for another animal. While the animal was retained by the clamp, the animal generally made a somewhat continuous effort to obtain freedom from the clamp and thus the animal continued to twist and pull about and away from the clamp in an attempt to obtain freedom from the restraint. Although the clamp generally was successful in retaining the animal within the animal holding space in such prior animal holding chutes, the animal sometimes twisted to the point of passing out or becoming unconscious or otherwise experienced minor damage, and the animal's continued twisting and moving motion made it difficult to complete the operations. In general, the animal experienced varying degrees of trama when confined in such prior animal holding chutes.

Utilizing the present animal holding chute 10, the animal is moved into the animal holding position within the animal holding space 18 in a relatively non-traumatic manner by the entrance gate 22 and the animal is held in the animal holding position within the animal holding space 18 by the entrance gate 22 cooperating with the retaining frame 12 in a relatively non-traumatic manner. When the animal is held in the animal holding position within the animal holding space 18, the animal does not tend to twist and move in an attempt to escape; rather, the animal maintains a relatively calm state when held in the animal holding space 18 by the entrance gate 22 cooperating with the retaining frame 12 and, in many instances, the operations can be performed on the animal without the use of the clamp. In addition, the gate support 24 is adapted to move the entrance gate 22 to various or a plurality of animal holding positions so the animal holding chute 10 easily and conveniently is adaptable to accommodate animals of varying sizes. The gate support 24 of the animal holding chute 10 is manually operable and the operating controls (actuating elements) conveniently are located so one individual can move the entrance gate 24 to the various animal holding positions and release the entrance gate 24 for returning the entrance gate 24 to the start position, although it should be noted that, in lieu of the manually operated elements, the gate support 24 could include a motor drive for moving the entrance gate 22 to the various animal holding positions and for returning the entrance gate 22 to the start position with the controls being located for manual actuation or with the motor drive being actuated by sensing of the animal position or some other animal or operational parameter, if desired in a particular application.

The retaining frame 12 includes: a first side frame 26 having a forward end 28, a rearward end 30, an upper end 32 and a lower end 34; a second side frame 36 having a forward end 38, a rearward end 40, an upper end 42 and a lower end 44; and a forward side frame 46 having opposite sides 48 and 50, an upper end 52 and a lower end 54. The second side frame 36 is spaced a distance 56 from the first side frame 26, and the second side frame 36 extends a distance generally parallel with the first side frame 26, the forward ends 28 and 38 of the first and the second side frames 26 and 36 being disposed in a generally coplanar disposition and the rearward ends 30 and 40 of the first and the second side frames 26 and 36 being disposed in a generally coplanar disposition. The forward side frame 36 extends generally between the first and the second side frames 26 and 36 generally near the forward ends 28 and 38 of the first and the second side frames 26 and 36, with one side 48 being pivotally connected to the forward end 28 of the first side frame 26 and the opposite side 50 being releasably connected to the second side frame 36.

More particularly, the side 50 of the forward side frame 46 is connected to the second side frame 36 by way of a latch (not shown) and, in the closed or locked position of the latch, the forward side frame 46 is securedly connected to the second side frame 36. In the opened position of the latch, the forward side frame 46 is pivotable to an opened position generally about the pivot connection between the forward side frame 46 and the first side frame 26 so an animal may pass from the animal holding space 18 through an exit 57 provided by the space between the first and the second side frames 26 and 36 generally at the forward ends 26 and 36.

The first and the second side frames 26 and 36 cooperate with the forward side frame 46 to define a generally rectangularly shaped retaining frame 12 with the upper ends 32, 42 and 52 forming the upper end 14 and the lower ends 34, 44 and 54 forming the lower end 16. The side frames 26, 36 and 46 cooperating to retainingly encompass the animal holding space 18 and the space between the rearward ends 30 and 40 of the first and the second side frames 26 and 36 defines the entrance 20.

The entrance gate 22 is generally rectangularly shaped and includes an upper end 58, a lower end 60, a first side 62 and a second side 64. The entrance gate 22 is supported by the gate support 24 and is disposed generally near the rearward ends 30 and 40 of the first and the second side frames 26 and 36 with the first side 62 being disposed generally near the rearward end 30 of the first side frame 26 and the second side 64 being disposed generally near the rearward end 40 of the second side frame 36. The entrance gate 22 extends generally between the upper and the lower ends 32, 42, 34 and 44 of the first and second side frames 26 and 36, the entrance gate 22 extending in a plane generally perpendicular to horizontal in the closed position of the entrance gate 22. The gate support 24 supports the entrance gate 22 from movement in a direction 66 generally from the rearward ends 30 and 40 toward the forward ends 28 and 38 of the first and the second side frames 26 and 36 to move the entrance gate 22 from the start position toward the animal holding position and for movement in an opposite direction 68 generally from the forward ends 28 and 38 toward the rearward ends 30 and 40 of the first and the second side frames 26 and 36 to move the entrance gate 22 from the animal holding position to the start position.

The entrance gate 22 includes a gate frame 70 comprising four bars 72 (designated individually in the drawings with the numerals 72a, 72b, 72c and 72d) interconnected in a generally rectangular shape with a bar 74 being connected to two of the bars 72a and 72b and extending generally across a portion of the gate frame 70 and being disposed generally between the upper and the lower ends 58 and 60 of the entrance gate 22. The entrance gate 22 is supported by the gate support 24 so the bar 72d forming the lower end 60 of the entrance gate 22 and the bar 74 are spaced a distance above the ground or, in other words, a distance above the lower ends 34 and 44 of the first and the second side frames 26 and 36 so the bar 72d and the bar 74 each are positioned to engage the rear end portion of the animal, along with portions of the bars 72a and 72b near the lower end 60, during the operation of the animal holding chute 10.

As generally shown in FIGS. 1, 2, 3, 4 and 5, and as shown more particularly in FIGS. 6, 7, 8, 9 and 10, the gate support 24 includes a gate track assembly 76 and a carriage 78. The gate track assembly 76 is connected to the upper ends 32 and 42 of the first and second side frames 26 and 36 and the gate track assembly 76 extends a distance generally from the rearward ends 30 and 40 toward the forward ends 28 and 38 of the first and the second side frames 26 and 36. The carriage 78 is movably supported on the gate track assembly 76 for movement in the directions 66 and 68. The upper end 58 (the bar 72c) of the entrance gate 22 is pivotally connected to the carriage 78. The carriage 78 is adapted to move the entrance gate 22 in the direction 66 from the start position to the animal holding position and for moving the entrance gate 22 in the direction 68 from the animal holding position to the start position, the pivotal connection between the carriage and the entrance gate 22 permitting the entrance gate 22 to be moved to and from the opened and the closed positions in a manner to be described in greater detail below.

The gate track assembly 76 includes a first rail 80 and a second rail 82. The first and the second rails 80 and 82 each have a generally circularly shaped cross-section and, in one embodiment, the first and the second side rails 80 and 82 each comprise a length of pipe, although it should be noted that the first and the second side rails 80 and 82 could have different forms and different cross-sections.

Figure 9:
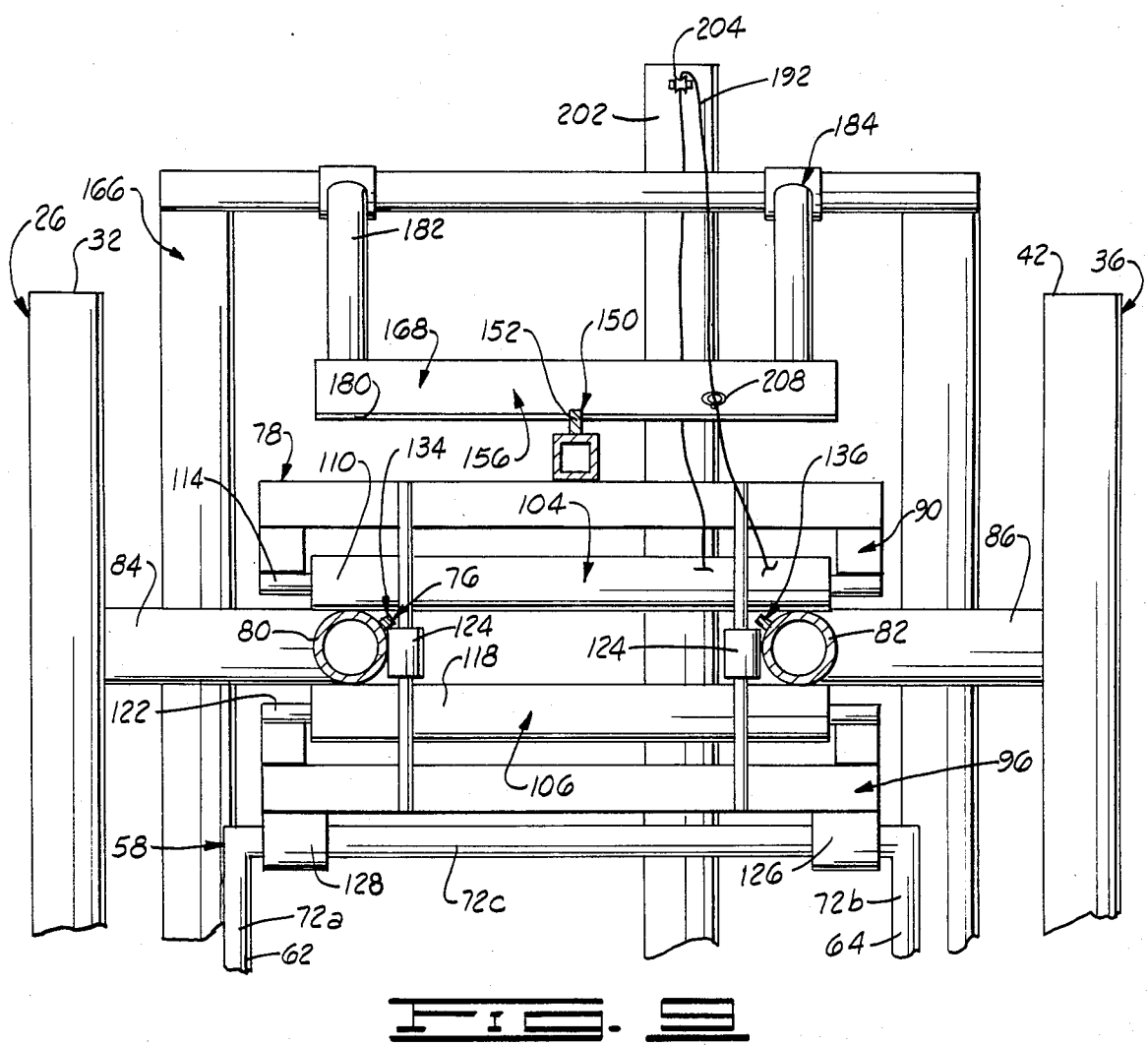
FIG. 9 is a partial sectional view, partial elevational view of a portion of the gate support, particularly showing the arm blade in engagement with the carriage moving track and the upper and the lower carriage frame rollingly supported on the first and the second rails.
Figure 10:
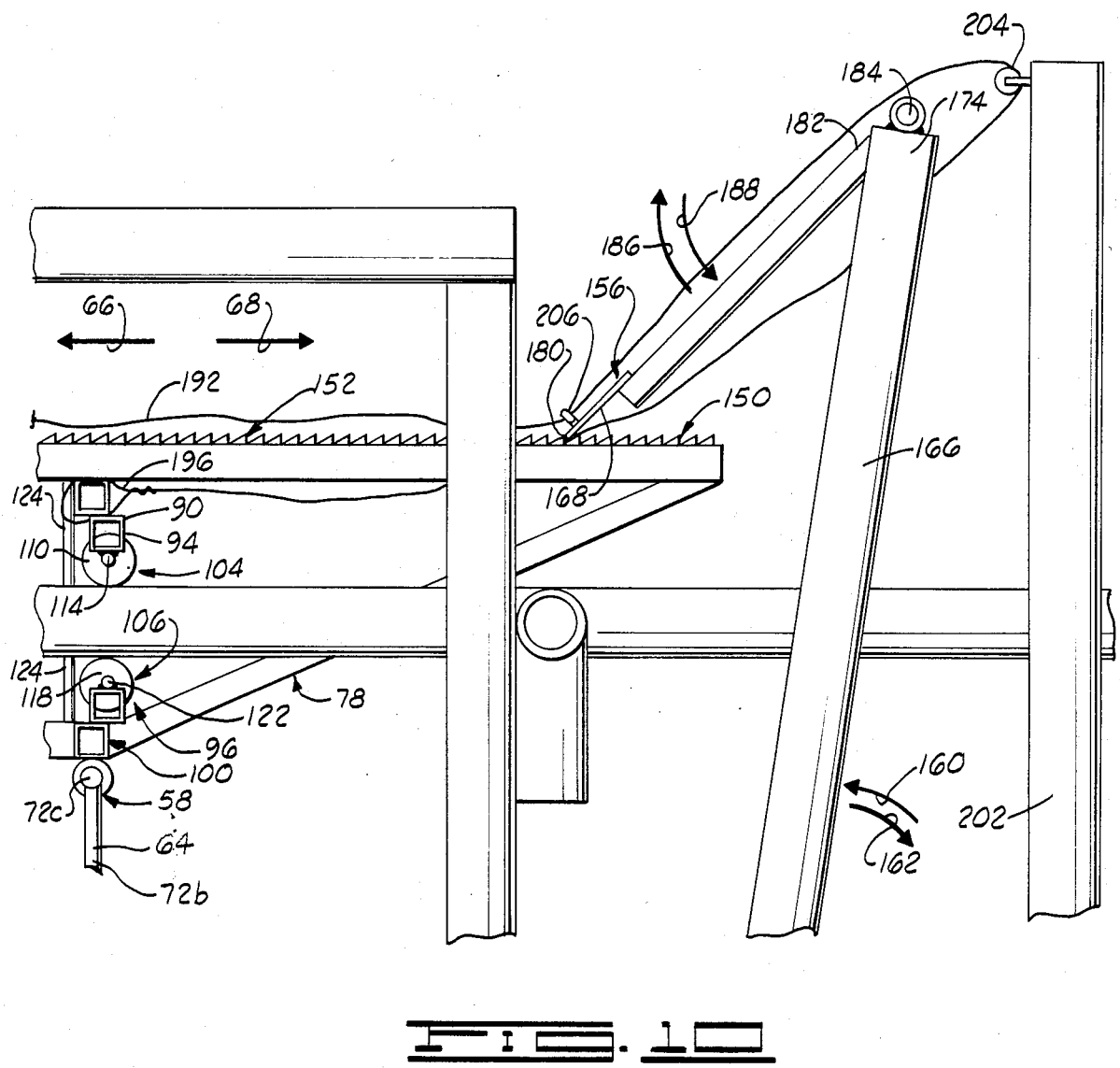
FIG. 10 is a side elevational view of a portion of the gate support, particularly showing one end portion of the carriage and the arm blade in engagement with the carriage moving track.

As shown more clearly in FIG. 9, the first rail 80 is connected to the upper end 32 portion of the first side frame 26 by a plurality of rail supports 84 (only one of the rail supports 84 being shown in the drawings). One end of each rail support 84 is connected to the first side frame 26 and the opposite end of each rail support 84 is connected to a portion of the first rail 80. The rail supports 84 thus connect the first rail 80 to the upper end 32 portion of the first side frame 26 so that the first rail 80 is spaced a distance from the first side frame 26 in a direction generally toward the second side frame 36.

As shown more clearly in FIG. 9, the second rail 86 is connected to the upper end 42 portion of the second side frame 36 by a plurality of rail supports 86 (only one of the rail supports 86 being shown in the drawings). One end of each rail support 84 is connected to the second side frame 36 and the opposite end of each rail support 86 is connected to a portion of the second rail 86. The rail support 86 thus connects the second rail 82 to the upper end 42 portion of the second side frame 36 so that the second rail 82 is spaced a distance from the second side frame 36 in a direction generally toward the first side frame 26.

The first rail 80 is spaced a distance 88 (FIG. 6) from the second rail 82 and the first rail 80 is generally aligned with the second rail 82. The first and the second rails 80 and 82 are aligned (disposed in substantially the same horizontal plane) and the first rail 80 extends in a generally parallel plane with respect to the second rail 82.

As shown more clearly in FIGS. 7, 8, 9 and 10, the carriage 78 includes a generally rectangularly shaped upper carriage frame 90 having a forward end 92 and a rearward end 94, and a generally rectangularly shaped lower carriage frame 96 having a forward end 98 and a rearward end 100. The upper carriage frame 90 is disposed generally above the first and the second rails 80 and 82, and the lower carriage frame 96 is disposed generally below the first and the second rails 80 and 82. The upper carriage frame 90 is aligned with and spaced a distance 102 (FIG. 8) from the lower carriage frame 96, the forward ends 92 and 98 being generally aligned and the rearward ends 94 and 100 being generally aligned. The upper carriage frame 90 extends in a plane generally parallel with the lower carriage frame 96.

As shown more clearly in FIGS. 7, 8, 9 and 10, the carriage 78 includes an upper roller assembly 104 and a lower roller assembly 106. The upper roller assembly 104 is journally connected to the upper carriage frame 90 and has a portion in rolling engagement with upper portions of the first and the second rails 80 and 82. The lower roller assembly 106 is journally connected to the lower carriage frame 96 and has a portion in rolling engagement with the lower portions of the first and the second rails 80 and 82.

The upper roller assembly 104 includes a first roller 108 and a second roller 110, as shown more clearly in FIGS. 7, 8, 9 and 10. The first roller 108 is journally connected to the upper carriage frame 90 generally near the forward end 92 of the upper carriage frame 90 by way of a shaft 112 which is secured to the first roller 108 with the opposite ends of the shaft 112 being journally connected to and supported in the upper carriage frame 90. The second roller 110 is journally connected to the upper carriage frame 90 generally near the rearward end 94 of the upper carriage frame 90 by way of a shaft 114 which is secured to the second roller 110 with the opposite ends of the shaft 114 being journally connected to and supported in the upper carriage frame 90.

The lower roller assembly 106 includes a first roller 116 and a second roller 118, as shown more clearly in FIGS. 7, 8, 9 and 10. The first roller 116 is journally connected to the lower carriage frame 96 generally near the forward end 98 of the lower carriage frame 96 by way of a shaft 120 which is secured to the first roller 116 with the opposite ends of the shaft 120 being connected to and supported in the lower carriage frame 96. The second roller 122 is journally connected to the lower carriage frame 96 generally near the rearward end 100 of the lower carriage frame 96 by way of a shaft 122 which is secured to the second roller 118 with the opposite ends of the shaft 122 being journally connected to and supported in the lower carriage frame 96.

The first roller 108 is generally aligned with the first roller 116 and the second roller 110 is generally aligned with the second roller 118. The upper carriage frame 90 is securely connected to the lower carriage frame 96 by way of a plurality of adjustable fasteners 124 (FIGS. 7, 8, 9 and 10) with each fastener 124 having one end portion connected to the upper carriage frame 90 and an opposite end portion connected to the lower carriage frame 96. The fasteners 124 are adjusted to pull the upper carriage frame 90 generally toward the lower carriage frame 96 to secure the rollers 108, 110, 116 and 118 in rolling engagement with the first and the second rails 80 and 82. The rollers 108, 110, 116 and 118 rollingly support the upper and the lower carriage frames 90 and 96 on the first and the second rails 80 and 82 for rolling movement in the directions 66 and 68 during the operation of the animal holding chute 10.

The bar 72c forming the upper end 58 of the entrance gate 22 is pivotally connected to the lower carriage frame 96 via a pair of journal supports 126 and 128 (shown more clearly in FIG. 9), the bar 72c extending through an opening formed through each of the journal supports 126 and 128. The journal supports 126 and 128 journally support the entrance gate 22 for pivotal movement in an opening direction 130 and in an opposite closing direction 132 (shown in FIGS. 1 and 3). The pivotal movement of the entrance gate 22 generally moves the entrance gate 22 in the opening direction 130 generally from the rearward ends 30 and 40 toward the forward ends 28 and 38 of the first and the second side frames 26 and 36 and the pivotal movement of the entrance gate 22 generally moves the entrance gate 22 in the closing direction 132 generally from the forward ends 28 and 38 toward the rearward ends 30 and 40 of the first and the second side frames 26 and 36.

As shown in FIGS. 1 and 3, the gate support 24 includes a first gate rod 131 and a second gate rod 133. One end of the first gate rod 131 is connected to the forward end 92 portion of the upper carriage frame 90 and the opposite end of the first gate rod 131 is slidably connected to the first side 62 (bar 72a) of the entrance gate 22. One end of the second gate rod 133 is connected to the forward end 92 portion of the upper carriage frame 90 and the opposite end of the second gate rod 133 is slidably connected to the second side 64 (bar 72b) of the entrance gate 22. The sliding connection between the first and the second gate rods 131 and 133 and the entrance gate 22 permits the entrance gate 22 to be pivotally moved in the opening direction 130 from the closed position to the opened position and to be pivotally moved in the closing direction 132 from the opened position to the closed position, although the gate rods 131 and 133 limit the movement of the entrance gate 22 in the closing direction 132 so the entrance gate 22 cannot be pivoted in the closing direction 132 beyond a position wherein the entrance gate 22 extends in a plane which is generally perpendicular to horizontal.

Figure 6:
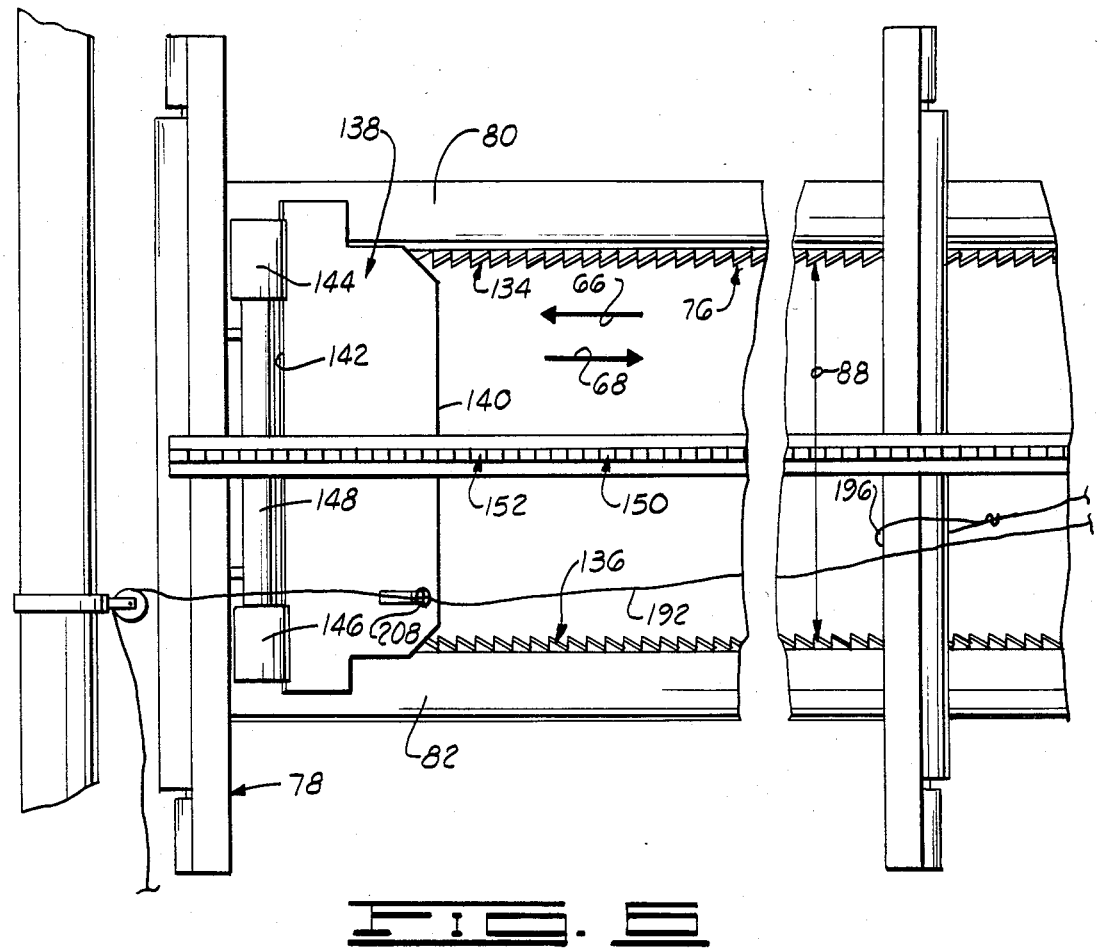
FIG. 6 is a plan view showing a portion of the gate support of the animal holding chute.

As shown more clearly in FIG. 6, the first rail 80 includes a plurality of teeth 134 which are formed on or connected to the first rail 80 and which are spaced along a length of the first rail 80 extending generally between the opposite ends of the first rail 80. The teeth 134 are positioned along an inner surface of the first rail 80.

As shown more clearly in FIG. 9, the second rail 82 also includes a plurality of teeth 136 which are formed on or connected to the second rail 82 and which are spaced along a length of the second rail 82 extending generally between the opposite ends of the second rail 82. The teeth 136 are positioned along an inner surface of the second rail 82 and the teeth 136 formed on the second rail 82 are spaced a distance from and generally aligned with the teeth 134 formed on the first rail 80.

Figure 7:
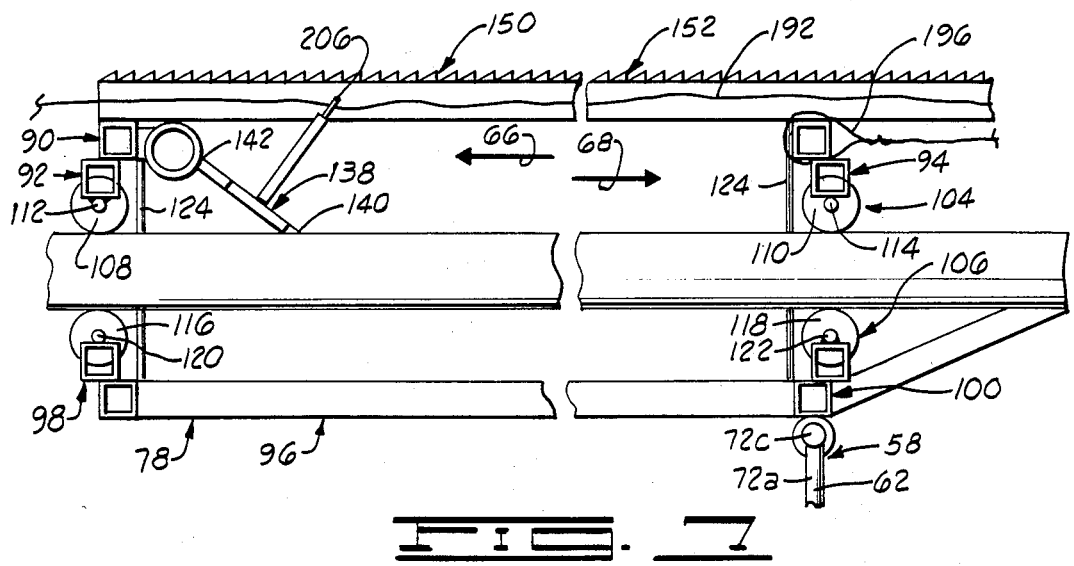
FIG. 7 is a side elevational view showing a portion of the gate support, particularly the carriage moving track and the upper and the lower carriage frames rollingly supported on the first rail.
Figure 8:
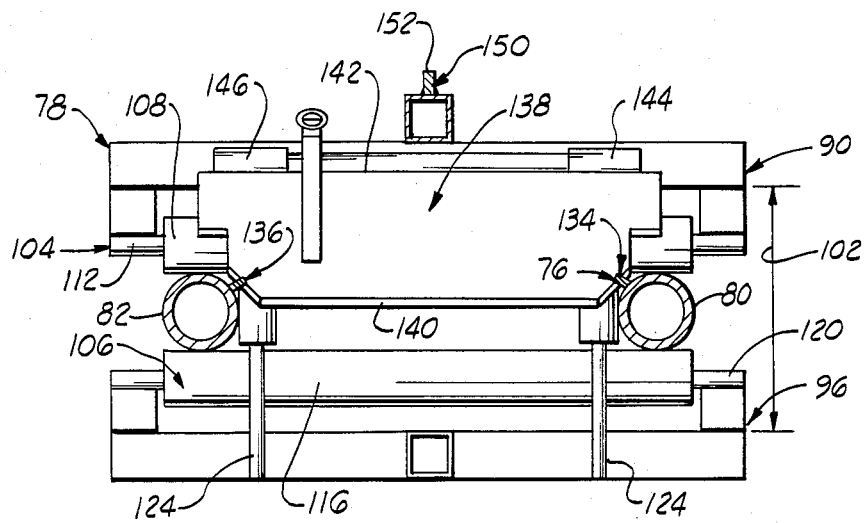
FIG. 8 is a partial sectional view, partial elevational view of a portion of the gate support, particularly showing the carriage blade in engagement with the teeth on the first and second rails.

The gate support 24 also includes a carriage blade 138 having a blade end 140 and a connecting end 142, as shown more clearly in FIGS. 6, 7 and 8. A connector 144 is connected to the connecting end 142 of the carriage blade 138 and another connector 146 also is connected to the connecting end 142 of the carriage blade 138. The connectors 144 and 146 are hollow, cylindrically shaped members with each connector 144 and 146 having an opening extending therethrough and intersecting the opposite ends thereof. A blade shaft 148 extends through the openings in each of the connectors 144 and 146 and one end of the blade shaft 148 is secured to a portion of the upper carriage frame 90 and the opposite end of the blade shaft 148 is secured to an opposite side portion of the upper carriage frame 90. The blade shaft 148 cooperates with the connectors 144 and 146 to pivotally connect the connecting end 142 of the blade 140 to the upper carriage frame 90. The carriage blade 138 thus is connected to the upper carriage frame 90 and extends a distance angularly from the upper carriage frame 90 terminating with the blade end 140, the carriage blade 138 being supported on the upper carriage frame 90 so that one side portion of the blade end 140 is engagable with the teeth 134 on the first rail 80 and an opposite side portion of the blade end 140 is engagable with the teeth 136 formed on the second rail 82. Thus, opposite side portions of the blade end 140 of the carriage blade 138 are removably engagable with the teeth 134 and 136 formed on the first and the second rails 80 and 82, respectively, so that the carriage blade removably engages the teeth 134 and 136 as the carriage 78 is moved in the direction 66 from the start position toward the animal holding position. The teeth 134 and 136 are constructed and oriented and the carriage blade 138 is oriented so that the blade end 140 of the carriage blade 138 engages the teeth 134 and 136 to prevent movement of the carriage 78 in a direction 68 generally from the animal holding position toward the start position of the entrance gate 22 to secure the carriage 78 and the entrance gate 22 connected thereto in the animal holding position. The carriage blade 138 is pivotally connected to the upper carriage frame 90, as mentioned before, so that the carriage blade 138 can be pivotally moved to disengage the carriage blade 138 from the teeth 134 and 136 so the carriage 78 and the entrance gate 22 connected thereto can be moved in the direction 68 from the animal holding position back to the start position, in a manner and for reasons which will be made more apparent below.

As shown more clearly in FIGS. 6, 7, 8, 9 and 10, the carriage 78 also includes a carriage moving track 150 which is connected to the upper carriage frame 90. The carriage moving track 150 includes a plurality of teeth 152 formed on an upper surface of the carriage moving track 150. The carriage moving track 150 is disposed generally midway between the first and the second rails 80 and 82 and the carriage moving track 150 extends a distance generally from the forward ends 28 and 38 of the first and the second side frames 26 and 36 to a position beyond the rearward ends 30 and 40 of the first and the second side frames 24 and 36.

As shown in FIGS. 1 and 3, the animal holding chute 10 includes an arm assembly 154 having a carriage engaging end 156 and an actuating end 158. The carriage engaging end 156 of the arm assembly 154 is positioned, shaped and adapted to be engagable with the teeth 152 on the carriage moving track 150. The actuating end 158 is positioned and adapted and the arm assembly 154 is supported so that the actuating end 158 can be engaged by an individual for moving the arm assembly in an actuating direction 160 and in an opposite releasing direction 162. The carriage engaging end 156 of the arm assembly 154 engages the teeth on the carriage moving track 150 so that movement of the arm assembly 154 in the actuating direction 160 causes the engaging end 156 of the arm assembly 154 to engage the teeth 152 on the carriage moving track 150 for moving the carriage moving track 150 and the carriage 78 connected thereto in the direction 66 generally from the stop position toward the animal holding position as the arm assembly 154 is moved in the actuating direction 160.

The arm assembly 154 more particularly includes a first arm 164, a second arm 166 and an arm blade 168. The first arm has a first end 170 and a second end 172. The first end 170 of the first arm 164 forms the actuating end 158 of the arm assembly 154. The second end 172 of the first arm 164 is disposed generally near the rearward end 40 of the second side frame 36 and generally near the lower end 44 of the second side frame 36, and the first arm 164 extends a distance generally from the rearward end 40 toward the forward end 38 of the second side frame 36 with the first end 170 of the first arm 164 being disposed generally near the forward end 38 of the second side frame 36.

The second arm 166 includes a first end 174 and a second end 176. The second end 176 of the second arm 166 is connected to the second end 172 of the first arm 164 and the second arm 166 extends a distance generally angularly upwardly from the first arm 164, the second arm 166 extending generally in a direction from the lower end 44 toward the upper end 42 of the second side frame 36 with the second end 176 of the second arm 166 being disposed generally near and spaced a distance from the rearward end 40 at the upper end 42 of the second side frame 36. The first and the second arm 164 and 166 are pivotally connected to the second side frame 36 generally at the connection between the second end 176 of the second arm 166 and the second end 172 of the first arm 164 at a pivot connection 178.

The arm blade 168 has a blade end 180 and a connecting end 182, as shown more clearly in FIGS. 5, 6, 7, 8, 9 and 10. The connecting end 182 of the arm blade 168 is pivotally connected to the second end 176 of the second arm 168 at a pivot connection 184 so that the arm blade 168 is pivotally movable about the pivot connection 184 in a generally upwardly direction 186 and in an opposite generally downwardly direction 188. The blade end 180 of the arm blade 168 forms the carriage engaging end 156 of the arm assembly 154. The arm blade 168 is supported generally above the carriage moving track 150 and positioned so that the blade end 180 of the arm blade 168 engages the teeth 152 formed on the carriage moving track 150 when the arm blade 168 has been pivotally moved in the downward direction 188, the arm blade 168 being pivotally movable in the upward direction 188 to disengage the blade end 180 of the arm blade 168 from the teeth 152 formed on the carriage moving track 150.

The arm assembly 154 also includes a spring 190 having opposite ends. One end of the spring 190 is connected to the first arm 164 at a position generally between the first and the second ends 170 and 172 of the first arm 164 and the opposite end of the spring 190 is connected to the rearward end 40 of the second side frame 36. The spring 190 biases the arm assembly in the releasing direction 162 for reasons which will be made more apparent below.

The animal holding chute 10 also includes a cable 192 having opposite ends 194 and 196. A grip 198 (FIGS. 1 and 2) is connected to the end 194 of the cable 192 and the grip 198 end of the cable 192 is disposed generally near the forward end 38 of the second side frame 36 at a position generally between the upper and the lower ends 42 and 44 of the second side frame 36. The cable 192 extends from the grip 198 end in an upwardly direction and is movably connected to the second side frame 36 by way of a movable connection 200 (FIG. 1). The cable 192 extends from the movable connection 200 generally along the upper end 42 of the second side frame to a position a distance beyond the rearward end 40 of the second side frame 36. The cable 192 is movably connected to one end of a post 202 by way of a movable connection 204 (FIGS. 1, 3, 8 and 9), the post 202 supporting the movable connection 204 and the cable 192 connected thereto at a position generally aligned with the upper end 42 of the second side frame 36 and spaced a distance beyond the rearward end 40 of the second side frame 36. The cable 192 extends from the movable connection 204 to a position wherein a portion of the cable 192 is movably connected to the arm blade 168 by way of a movable connection 206 (shown more clearly in FIGS. 9 and 10). The cable 192 extends from the movable connection 206 on the carriage blade 138 to a position wherein a portion of the cable 192 is movably connected to the carriage blade 138 by way of a movable connection 208. The cable 192 extends from the movable connection 208 on the carriage blade 138 to a position wherein the end 196 of the cable is secured to the carriage 78.

In operation and assuming that the entrance gate 22 is in the closed position and the carriage 78 has been moved in the direction 68 to position the carriage 78 and the entrance gate 22 connected thereto in the start position, an animal enters the animal holding chute 10 by passing through the opening defining the entrance 20 between the rearward ends 30 and 40 of the first and the second side frames 26 and 36. As the animal enters the animal holding chute 10, the animal's head engages a portion of the entrance gate 22 and, as the animal moves in the direction 68, the animal pivotally moves the entrance gate 22 in the opening direction 130 to allow the animal to enter into the animal holding space 18. After the animal has passed through the entrance gate 22, the entrance gate 22 automatically is pivoted in the closing direction 132 to position the entrance gate 22 in the closed position. The pivot connection provided by the journal supports 126 and 128 together with the first and the second gate rods 131 and 133 permit the entrance gate 22 to be moved in the opening direction 130 to the opened position; however, the pivot connections provided by the journal supports 126 and 128 together with the first and the second gate rods 131 and 133 are adapted such that the entrance gate 22 only can be moved in the closing direction 132 to the closed position wherein the entrance gate 22 extends in a plane approximately perpendicular to horizontal.

After the animal has moved through the entrance gate 22 and the entrance gate 22 has been returned to the closed position, an individual engages the actuating end 158 of the arm assembly 154 by pressing the individual's foot in the downward direction on the actuating end 158 thereby causing the arm assembly 154 to be pivoted in the actuating direction 160. When the arm assembly 154 is pivoted in the actuating direction 160, the blade end 180 of the arm blade 168 engages the teeth 152 on the carriage moving track 150 thereby causing the carriage 78 and the entrance gate 22 connected thereto to be moved in the direction 66. As the entrance gate 22 is moved in the direction 66, the entrance gate 22 engages the rear end portion of the animal, thereby moving the animal in the direction 66. The individual continues to press in the downwardly direction on the actuating end 158 of the arm assembly 154 to cause the entrance gate 22 to move the animal in the direction 66 until the animal has been moved in the direction 66 to properly position the front end portion of the animal generally adjacent the forward side frame 46 thereby positioning the animal in the animal holding position within the animal holding space 18.

As the carriage 78 with the entrance gate 22 connected thereto is moved in the direction 66, the blade end 140 on the carriage blade 138 is moved over the teeth 134 and 136 on the first and the second rails 80 and 82, respectively; however, the teeth 134 and 136 are oriented with respect to the blade end 140 on the carriage blade 138 so that the carriage blade 138 does not prevent the carriage 78 from being moved in the direction 66. When the animal has been positioned in the animal holding position within the animal holding space 18, the entrance gate 22 then is positioned in the animal holding position and the individual ceases applying pressure to the actuating end 158 of the arm assembly 154. When the carriage 78 with the entrance gate 22 connected thereto has been moved to the animal holding position, the blade end 140 of the carriage blade 138 engages the teeth 134 and 136 on the first and the second rails 80 and 82, respectively, thereby preventing the carriage 78 from being moved in the direction 68 and cooperating to hold the carriage 78 with the entrance gate 22 connected thereto in the animal holding position.

When it is desired to remove the animal from the animal holding space 18, the forward side frame 46 is unlocked and pivotally moved to open the space between the forward ends 28 and 38 of the first and the second side frames 26 and 36 defining the exit 57, thereby permitting the animal to leave the animal holding space 18 through the exit 57. The forward side frame 46 then is moved to the closed position and locked in this position to condition the animal holding chute 10 for receiving another animal.

The individual then grasps the grip 198 on the cable 192 and pulls the grip 198 in the downward direction. As the grip 198 end of the cable 192 is pulled in the downward direction, the connection between the cable 192 and the carriage blade 138 causes the carriage blade 138 to be pivoted in the upward direction thereby disengaging the blade end 140 on the carriage blade 138 from the teeth 134 and 136 on the first and second rails 80 and 82. Further, as the grip 198 end of the cable 192 is pulled in the downward direction, the connection between the cable 192 and the arm blade 168 causes the arm blade 168 to be pivoted in the upward direction 186 thereby disengaging the blade end 180 of the arm blade 168 from the teeth 134 and 136 on the first and the second rails 80 and 82 thereby permitting the carriage 78 with the entrance gate 22 connected thereto to be moved in the direction 68. The individual continues to pull the grip 198 end of the cable 192 in the downward direction and, since the end 196 of the cable 192 is connected to the carriage 78, the pulling of the grip 198 end of the cable 192 in the downward direction causes the carriage 78 to be moved in the direction 68 from the animal holding position toward the start position. The individual or operator continues to pull the grip 198 end of the cable 192 in the downward direction until the carriage 78 with the entrance gate 22 connected thereto has been moved in the direction 68 to a position wherein the entrance gate 22 is positioned in the start position. Then, the animal holding chute 10 is conditioned to receive another animal.

In the animal holding position, the rear end portion of the animal is engaged by the entrance gate 22, and the animal is confined between the entrance gate 22 and the forward side frame 46 and between the first and second side frames 26 and 36. The side frames 26, 36 and 46 cooperate with the entrance gate 22 to hold the animal within the animal holding position in a secure and non-threatening manner. The retaining frame 12 as shown in the drawings includes a clamp; however, it has been found that many operations can be carried out on many animals without the use of the clamp when the animal is held in the animal holding space 18 in accordance with the present invention.

Embodiment of FIGS. 11, 12, 13, 14 and 15

Shown in FIGS. 11, 12, 13, 14 and 15 is a modified carriage 78$f$ which is movably supported on a modified gate track assembly 76$f$ for movement in the directions 66 and 68. The upper end 58 (the bar 72$c$) of the entrance gate 22 is pivotally connected to the carriage 78$f$ and the carriage 78$f$ is adapted to move the entrance gate 22 in the direction 66 from the start position to the animal holding position and for moving the entrance gate 22 in the direction 68 from the animal holding position to the start position, the pivotal connection between the carriage 78$f$ and the entrance gate 22 permitting the entrance gate 22 to be moved to and from the opened and the closed position in the manner described before with respect to the carriage 78 and the entrance gate 22.

The gate track assembly 76$f$ is constructed exactly like the gate track assembly 76, described in detail before, except the first rail 80 includes a plurality of modified teeth 134$f$ and the second rail 82 includes a plurality of modified teeth 136$f$. The teeth 134$f$ and 136$f$ on the first and the second rails 80 and 82 cooperate with the carriage blade 138 to prevent movement of the carriage 78$f$ in the direction 68 when the carriage blade 138 is in engagement with the teeth 134$f$ and 136$f$, in a manner exactly like that described before with respect to the teeth 134 and 136 on the first and the second rails 80 and 82.

Figure 13:
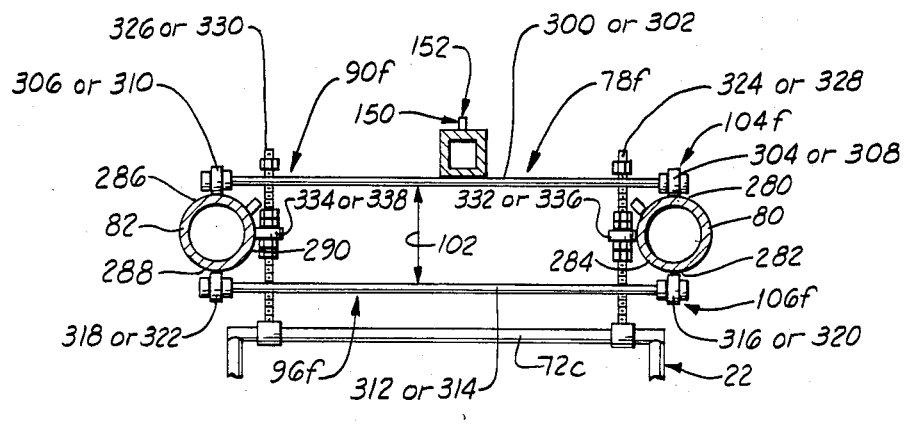
FIG. 13 is a typical sectional view showing the modified carriage of FIG. 11 and, more particularly, showing the first axles or the second axles with the associated rollers and auxillary rollers.

The first rail 80 includes an upper surface 280, a lower surface 282 and an inside surface 284 which is disposed generally between the upper and the lower surfaces 280 and 282 (shown more clearly in FIG. 13). The second rail 82 includes an upper surface 286, a lower surface 288 and an inside surface 290 (shown more clearly in FIG. 13). The inside surface 290 of the second rail 82 generally faces and is spaced a distance from the inside surface 284 of the first rail 80.

The modified carriage 78$f$ includes an upper carriage frame 90$f$ having a forward end 92$f$ and a rearward end 94$f$, and a lower carriage frame 96$f$ having a forward end 98$f$ and a rearward end 100$f$ (shown in FIGS. 11 and 12). The upper carriage frame 90$f$ is disposed generally above the upper surfaces 280 and 286 of the first and the second rails 80 and 82, and the lower carriage frame 96$f$ is disposed generally below the first and the second rails 80 and 82. The upper carriage frame 90$f$ is aligned with and spaced the distance 102 (FIG. 13) from the lower carriage frame 96$f$, the forward ends 92$f$ and 98$f$ being generally aligned and the rearward ends 94$f$ and 100$f$ being generally aligned. The upper carriage frame 90$f$ extends in a plane generally parallel with the lower carriage frame 96$f$.

The carriage 78$f$ also includes an upper roller assembly 104$f$ and a lower roller assembly 106$f$. The upper roller assembly 104f generally is journally connected to the upper carriage frame 90f and has portions in rolling engagement with the upper surfaces 280 and 286 of the first and the second rails 80 and 82. The lower roller assembly 106f is journally connected to the lower carriage frame 96f and has portions in rolling engagement with the lower surfaces 282 and 288 of the first and the second rails 80 and 82.

The upper carriage frame 90f includes a first axle 300 having opposite ends and a second axle 302 having opposite ends (the first and the second axles 300 and 302 shown more clearly in FIGS. 11 and 12). A roller 304 is journally connected to one end of the first axle and another roller 306 is journally connected to the opposite end of the first axle 300. The roller 304 is disposed near the forward end 92f of the upper carriage frame 90f and the roller 304 is positioned to rollingly engage the upper surface 280 of the first rail 80. The roller 306 is disposed near the forward end 92f of the upper carriage frame 90f and the roller 306 is positioned to rollingly engage the upper surface 286 of the second rail 82. The second axle 302 is spaced a distance from the first axle 300 and a roller 308 is journally connected to one end of the second axle 302 and another roller 310 is journally connected to the opposite end of the first axle 302. The roller 308 is disposed near the rearward end 94f of the upper carriage frame 90f and the roller 308 is positioned to rollingly engage the upper surface 280 of the first rail 80. The roller 310 is disposed near the rearward end 94f of the upper carriage frame 90f and the roller 310 is positioned to rollingly engage the upper surface 286 of the second rail 82.

The roller 304 on the first axle 300 generally is aligned with the roller 308 on the second axle 302, and the roller 306 on the first axle 300 generally is aligned with the roller 310 on the second axle 302. The rollers 304, 306, 308 and 310 each comprise portions of the upper roller assembly 104f.

The lower carriage frame 96f includes a first axle 312 and a second axle 314. The first and the second axles 312 and 314 each extend generally between the first and the second rails 80 and 82 and the first and the second axles 312 and 314 each are disposed generally below the lower surfaces 282 and 288 of the first and the second rails 80 and 82, respectively. A roller 316 is journally connected to one end of the first axle 312 and a roller 318 is journally connected to the opposite end of the first axle 312. The roller 316 is disposed generally near the forward end 98f of the lower carriage frame 96f and the roller 316 is positioned to rollingly engage the lower surface 282 of the first rail 80. The roller 318 is disposed generally near the forward end 98f of the lower carriage frame 96f and the roller 316 is positioned to rollingly engage the lower surface 288 of the second rail 82. A roller 320 is journally connected to one end of the second axle 314 and a roller 322 is journally connected to the opposite end of the second axle 314. The roller 320 is disposed generally near the rearward end 100f of the lower carriage frame 96f and the roller 320 is positioned to rollingly engage the lower surface 282 of the first rail 80. The roller 322 is disposed generally near the rearward end 100f of the lower carriage frame 96f and the roller 322 is positioned to rollingly engage the lower surface 288 of the second rail 82. The rollers 316, 318, 320 and 322 each compromise a portion of the lower roller assembly 106f.

The first and the second axles 312 and 314 each generally are aligned and positioned generally below the lower surfaces 282 and 288 of the first and the second rails 80 and 82, respectively. The roller 316 generally is aligned with the roller 320 and the first and the second axles 312 and 314 support the rollers 316 and 320 so that the rollers 316 and 320 each rollingly engage the lower surface 282 of the first rail 80. The roller 318 is generally aligned with the roller 322 and the first and the second axles 312 and 314 are positioned so that the roller 318 and the roller 322 each rollingly engage the lower surface 288 of the second rail 82.

The upper carriage frame 90f is securely connected to the lower carriage frame 96f by way of a plurality of adjustable fasteners 324, 326, 328 and 330. More particularly, one end of each of the fasteners 324 and 326 is connected to the first axle 300 and the opposite end of each of the fasteners 324 and 326 is connected to the first axle 312. One end of each of the fasteners 328 and 330 is connected to the second axle 302 and the opposite end of each of the fasteners 326 and 330 is connected to the second axle 314.

The fasteners 324 and 328 are disposed generally near the first rail 80 and the fasteners 326 and 330 are disposed generally near the second rail 82. The fasteners 324, 326, 328, and 330 are adjustable to pull the upper carriage frame 90f generally toward the lower carriage frame 96f to secure the rollers 304, 306, 308, 310, 316, 318, 320 and 322 in rolling engagement with the first and the second rails. The rollers 304, 306, 308, 310, 316, 318, 320 and 322 each rollingly engage one of the first and the second rails 80 and 82 and cooperate to rollingly support the upper and the lower carriage frames 90f and 96f on the first and the second rails 80 and 82 for rolling movement in the direction 66 and 68 during the operation of the animal holding chute.

The adjustable fastener 324 extends generally between the first axles 300 and 312 and is disposed generally near the first rail 80. An auxillary roller 332 is journally connected to the fastener 324. The auxillary roller 332 is oriented generally perpendicular with respect to the rollers 304 and 308 and the fastener 324 is positioned on the first axles 300 and 312 so that the auxillary roller 332 rollingly engages the inside surface 284 of the first rail 80.

The adjustable fastener 326 extends generally between the first axles 300 and 312 and is disposed generally near the second rail 82. An auxillary roller 334 is journally connected to the fastener 326. The auxillary roller 334 is oriented generally perpendicular with respect to the rollers 306 and 310 and the fastener 326 is positioned on the first axles 300 and 312 so that the auxillary roller 334 rollingly engages the inside surface 290 of the second shaft 82.

The adjustable fastener 328 extends generally between the second axles 302 and 314 and is disposed generally near the first rail 80. An auxillary roller 336 is journally connected to the fastener 328. The auxillary roller 326 is oriented generally perpendicular with respect to the rollers 316 and 320 and the fastener 336 is positioned on the second axles 302 and 314 so that the auxillary roller 338 rollingly engages the inside surface 284 of the first rail 80.

The adjustable fastener 330 extends generally between the second axles 302 and 314 and is disposed generally near the second rail 82. An auxillary roller 338 is journally connected to the fastener 330. The auxillary roller 338 is oriented generally perpendicular with respect to the rollers 318 and 322 and the fastener 330 is positioned on the second axles 302 and 314 so that the auxillary roller 338 rollingly engages the inside surface 290 of the second rail 82.

Thus, the two auxillary rollers 332 and 336 supported on the fasteners 324 and 328, respectively, each rollingly engage the inside surface 284 of the first rail 80, and the auxillary rollers 334 and 338 supported on the fasteners 326 and 330, respectively, each rollingly engage the inside surface 90 of the second rail 82, so that the auxillary rollers 332, 334, 336 and 338 each cooperate to maintain the carriage 78f generally aligned with the first and the second rails 80 and 82 as the carriage 78f is moved in the directions 66 and 68 during the operation of the animal holding chute of the present invention.

Figure 14:
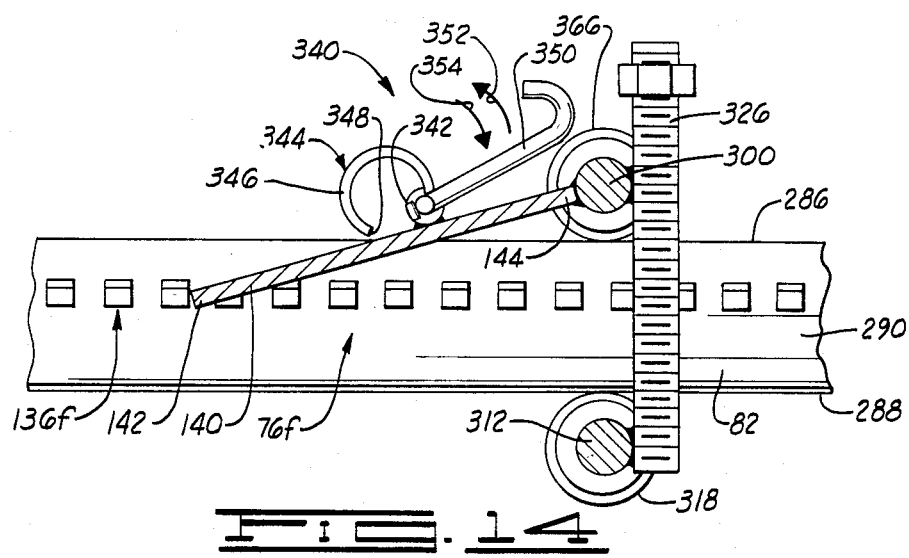
FIG. 14 is a partial sectional, partial elevational view showing the blade release positioned to engage the carriage blade.
Figure 15:
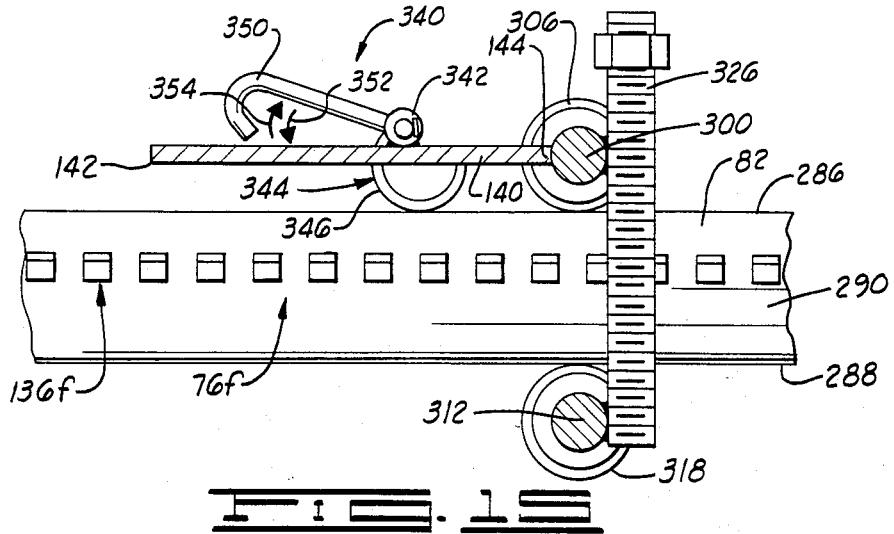
FIG. 15 is a partial sectional, partial elevational view, similar to FIG. 14, but showing the blade release positioned to disengage the carriage arm.

As generally shown in FIGS. 11 and 12 and as shown more particularly in FIGS. 14 and 15, the connecting end 142 of the carriage blade 138 is pivotally connected to the first axle 302 of the upper carriage frame 90f and supported so that the blade end 140 of the carriage blade 138 is pivotable to a position wherein the blade end 140 engages the teeth 134f and 136f on the first and the second rails 80 and 82 in one position of the carriage blade 138 for preventing movement of the carriage 76f in the direction 68 in a manner and for reasons described before with respect to the carriage 78.

A blade release 340 is connected to a portion of the carriage blade 138, generally near the blade end 140 thereof, and the blade release 340 is disposed generally near the second rail 82. More particularly, the blade release 340 includes a shaft 342 having one end pivotally connected to the carriage blade 138 and the opposite end of the shaft 342 is securely connected to a cam 344.

The cam 344 is disposed generally on the upper surface 286 of the second rail 82. The cam 344 has an outer peripheral surface forming a cam surface 346 which is in engagement with the upper surface 280 of the first rail 80. The cam 344 shown in the drawings is ring-shaped and a portion of the ring is cut out to form a cutaway portion 348, the cutaway portion 348 forming a portion of the cam surface 346. In one form, the cam 344 could be solid and a portion of the cam surface 246 shaped to imitate the camming action of the cutaway portion 348.

One end of a release arm 350 is connected to the cam 344 and the release arm 350 extends a distance from the cam 344, the release arm 350 forming a hand-gripable release arm 350.

It should be noted that, in the embodiment of the animal holding chute shown in FIGS. 11, 12, 13, 14 and 15, the cable 192 is not connected to the carriage blade 138.

In operation and assuming the entrance gate 22 is in the closed position and the carriage 78f has been moved in the direction 68 to position the carriage 78f and the entrance gate 22 connected thereto in the start position, an animal enters the animal holding chute by passing through the opening defining the entrance. As the animal enters the animal holding chute, the animal's head engages a portion of the entrance gate 22 and moves the entrance gate 22 in the opening direction in a manner and for reasons exactly like that described before with respect to the animal holding chute 10. After the animal has entered through the entrance gate 22 and after the entrance gate 22 automatically has been pivoted to the closed position, an individual utilizes the arm assembly 154 to move the carriage 78f and the entrance gate 22 connected thereto in the direction 66 until the entrance gate 22 has been positioned in the animal holding position. As the carriage 78f is moved in the direction 66, the blade end 140 on the carriage blade 138 is moved over the teeth 134f and 136f on the first and the second rails 80 and 82, respectively, in a manner exactly like that described before with respect to the carriage blade 138 and the teeth 134 and 136 on the first and the second rails 80 and 82, respectively. When the carriage 78f with the entrance gate 22 connected thereto has been moved to the animal holding position, the blade end 140 of the carriage blade 138 engages the teeth 134f and 136f on the first and the second rails 80 and 82, respectively, thereby preventing the carriage 78f from being moved in the direction 68 and cooperating to hold the carriage 78f with the entrance gate 22 connected thereto in the animal holding position.

When it is desired to remove the animal from the animal holding space, the forward side frame 46 is unlocked and pivotally moved to open the space between the forward ends of the first and the second side frames in the manner exactly like that described before with respect to the animal holding chute 10, thereby permitting the animal to leave the animal holding space.

The individual then grasps the release arm 350 and pivots the release arm 350 in a direction 352. When the release arm 350 is pivoted in the direction 352, the cam 344 engages the upper surface 282 of the second rail 82 and pivotally moves the carriage blade 138 in the upward direction thereby disengaging the blade end 140 on the carriage blade 138 from the teeth 134f and 136f on the first and the second rails 80 and 82. When the carriage blade 138 has been disengaged from the teeth 134f and 136f on the first and the second rails 80 and 82, the carriage 78f then is permitted to be moved in the direction 68. After the release arm 350 has been pivoted in the direction 352 to disengage the carriage blade 138 from the teeth 134f and 136f on the first and the second rails 80 and 82, the individual then pulls the cable 192 in the downward direction thereby causing the carriage 78f to be moved in the direction 68 from the animal holding position toward the start position. The operator or individual continues to pull the cable 192 in the downward direction until the carriage 78f with the entrance gate 22 connected thereto has been moved in the direction 68 to a position wherein the entrance gate 22 is positioned in the start position. In this position, the individual then pivots the release arm 350 in a direction 354 to move the carriage blade 138 downwardly to a position wherein the blade end 140 on the carriage blade 138 again is engagable with the teeth 134f and 136f on the first and the second rails 80 and 82 so that the carriage 78f again is positioned for permitting an animal to be moved into the animal holding chute and the carriage 78f to be moved in the direction 66 from the start position to the animal holding position.

Changes may be made in the various parts, elements and assemblies of the animal holding chute 10 described herein without departing from the spirit and the scope of the present invention as defined in the following claims.

What is claimed is:

1. An animal holding chute, comprising:
   a retaining frame retainingly surrounding an animal holding space and having an entrance formed through a portion thereof, the animal holding space being sized and shaped for accommodating an animal and the retaining frame cooperating to retainingly hold an animal within the animal holding space and the entrance being sized and shaped to permit an animal to pass therethrough and into the animal holding space, the retaining frame comprising:
a first side frame having a forward end, a rearward end, an upper end and a lower end;
a second side frame having a forward end, a rearward end, an upper end and a lower end, the second side frame being spaced a distance from the first side frame; and
a forward side frame extending generally between the first and the second side frames generally near the forward ends of the first and the second side frames, and the first side frame, the second side frame and the forward side frame cooperating to retainingly surround the animal holding space and the rearward ends of the first and the second side frames being spaced a distance apart defining the entrance;
an entrance gate sized and shaped for substantially closing the entrance for substantially preventing an animal from leaving the animal holding space by passing from the animal holding space through the entrance, the entrance gate having an upper end, a lower end, a first side and a second side, the entrance gate being disposed generally near the rearward ends of the first and the second side frames with the first side of the entrance gate being disposed generally near the rearward end of the first side frame and the second side of the entrance gate being disposed generally near the rearward end of the second side frame and the entrance gate extending generally between the first and the second side frames in a start position of the entrance gate, the entrance gate being moved a distance in the direction generally from the rearward ends of the first and the second side frames toward the forward ends of the first and the second side frames as the entrance gate moves from the start position toward an animal holding position; and
a gate support for movably supporting the entrance gate for movement to an opened position and to a closed position and for movement to the start position and to the animal holding position, the gate support supporting the entrance gate near the entrance and the entrance gate being positioned generally within a portion of the entrance in the closed position of the entrance gate for substantially preventing an animal from leaving the animal holding space through the entrance and the entrance gate being removed from at least a portion of the entrance in the opened position of the entrance gate for permitting an animal to pass through the entrance and into the animal holding space, a portion of the entrance gate engaging the rear end portion of the animal as the entrance gate moves from the start position to the animal holding position for moving the animal into an animal holding position within the animal holding space and the entrance gate and the retaining frame substantially surrounding the animal and being disposed near the animal and the entrance gate cooperating with the retaining frame to retain the animal within the animal holding space in the animal holding position of the entrance gate, the gate support being connected to the first and the second side frames generally near the upper ends of the first and the second side frames, one end of the gate support being disposed generally near the rearward ends of the first and the second side frames and the gate support extends a distance generally from the rearward end toward the forward end of the first and the second side frames, the gate support including means for moving the entrance gate from the start position to a plurality of animal holding positions, each animal holding position being spaced a different distance from the forward ends of the first and the second side frames for accommodating animals of different sizes, the gate support comprising:
a gate track assembly connected to the upper ends of the first and the second side frames and extending a distance generally from the rearward ends of the first and the second side frames toward the forward ends of the first and the second side frames;
a carriage movably supported on the gate track assembly for movement in a direction from the rearward ends of the first and the second side frames toward the forward ends of the first and the second side frames and for movement in an opposite direction from the forward ends of the first and the second side frames toward the rearward ends of the first and the second side frames, the entrance gate being connected to the carriage and the carriage being adapted to cooperate in moving the entrance gate from the start position to the animal holding position and for moving the entrance gate from the animal holding position to the start position; and
means for moving the carriage on the gate track assembly from the start position in a direction from the rearward ends of the first and second side frames toward the forward ends of the first and second side frames to the animal holding position, and for moving the carriage on the gate track assembly from the animal holding position in a direction from the forward ends of the first and the second side frames toward the rearward ends of the first and the second side frames to the start position.

2. The animal holding chute of claim 1 wherein the first side frame is substantially parallel with the second side frame and wherein the forward ends of the first and second side frames are positioned in an about coplanar disposition and wherein the rearward ends of the first and second side frames are positioned in an about coplanar disposition, the first side frame, the second side frame and the forward side frame cooperating to retainingly surround a substantially rectangularly shaped animal holding space.

3. The animal holding chute of claim 2 wherein the first and the second side frames and the forward end frame and the entrance gate each are positioned generally near the animal with the entrance gate in the animal holding position and the animal disposed in the animal holding space.

4. The animal holding chute of claim 1 wherein the entrance gate has an upper end, a lower end, a first side and a second side, and wherein the entrance gate is disposed within and extends generally across a substantial portion of the entrance in the closed position, and wherein the gate support includes means pivotally connected to the upper end portion of the entrance gate for permitting pivotal movement of the entrance gate in an opening direction from the closed position to the opened position permitting an animal to pass through the entrance and into the animal holding space, the entrance gate being pivotally movable in a closing direction from the opened position to the closed position; and means connected to the entrance gate for limiting movement of the entrance gate in the closing direction for preventing the animal to pass from the animal holding space through the entrance gate.

5. The animal holding chute of claim 4 wherein the entrance gate extends in a plane generally perpendicular to horizontal in a direction generally from the upper end to the lower end and in the closed position of the entrance gate.

6. The animal holding chute of claim 1 wherein the means for moving the carriage is defined further to include:

an arm assembly having a carriage engaging end and an opposite actuating end, the carriage engaging end being engagable with the carriage and the actuating end being engagable for moving the arm assembly in an actuating direction and for moving the arm assembly in an opposite releasing direction, the carriage engaging end engaging a portion of the carriage and moving the carriage generally from the stop position toward the animal holding position as the arm assembly moves in the actuating direction.

7. The animal holding chute of claim 6 wherein the means for moving the carriage is defined further to include:

means biasing the arm assembly in the releasing direction, the actuating end being engagable for moving the arm assembly in the actuating direction against the biasing of said means.

8. The animal holding chute of claim 6 wherein the carriage is defined further to include:

a carriage moving track connected to the carriage and extending a distance generally between the forward ends and the rearward ends of the first and the second side frame, the carriage moving track being engagable by the carriage engaging end of the arm assembly for moving the carriage moving track and the carriage connected thereto from the start position toward the animal holding position.

9. The animal holding chute of claim 8 wherein the carriage moving track is defined further as including a plurality of teeth and wherein the arm assembly is defined further to include an arm blade forming the carriage engaging end of the arm assembly, the arm blade having a blade end engagable with the teeth for cooperating in moving the carriage from the start position to the animal holding position.

10. The animal holding chute of claim 9 wherein the arm assembly is defined further to include:

a first arm having a first end and a second end with the first end of the first arm forming the engaging end of the arm assembly and the second end of the first arm being disposed generally near the rearward end and generally near the lower end of the second side frame, the first arm extending a distance generally from the rearward end toward the forward end of the second side frame terminating with the first end of the first arm;

a second arm having a first end and a second end with the second end of the second arm being connected to the second end of the first arm and the second arm extending a distance at an angle from the first arm in a direction generally from the lower end of the second side frame toward the upper end of the second side frame; and means pivotally supporting the first and the second arms generally at the connection between the second ends of the first and the second arms for pivotal movement of the first and the second arms in the actuating and releasing directions; and wherein the arm blade is defined further as having a portion thereof pivotally connected to the first end of the second arm.

11. The animal holding chute of claim 10 wherein the arm assembly is defined further to include:

a spring having one end connected to the first arm at a position generally between the first and the second ends of the first arm and the opposite end connected to the second side frame, the spring biasing the first end and the second arm connected thereto in the releasing direction.

12. The animal holding chute of claim 11 wherein the first end of the first arm is adapted to be engaged by an individual for manually moving the arm assembly in the actuating direction against the biasing force of the spring.

13. The animal holding chute of claim 12 wherein the first end of the first arm is disposed generally near the forward end of the second side frame.

14. The animal holding chute of claim 1 wherein the gate track assembly is defined further to include:

a first rail connected to the first side frame generally near the upper end of the first side frame, the first rail extending a distance generally between the rearward end and the forward end of the first side frame; and a second rail connected to the second side frame generally near the upper end of the second side frame, the second rail extending a distance generally between the rearward end and the forward end of the second side frame and generally parallel and aligned with the first rail; and wherein the carriage is defined further to include:

an upper carriage frame disposed generally above the first and the second rails; and an upper roller assembly journally connected to the upper carriage frame and having portions rollingly engaging the first and the second rails for cooperating to rollingly support the entrance gate on the first and the second rails.

15. The animal holding chute of claim 14 wherein the carriage is defined further to include:

a lower carriage frame disposed generally below the first and second rails; and a lower roller assembly journally connected to the lower carriage frame and having a portion rollingly engaging the first and the second rails for cooperating with the upper roller assembly to rollingly support the entrance gate on the first and the second rails.

16. The animal holding chute of claim 15 wherein the upper carriage frame is defined further as being generally rectangularly shaped and having a forward end and a rearward end, and wherein the upper roller assembly is defined further to include:

a first roller journally connected to the upper carriage frame generally near the forward end of the upper carriage frame and rollingly engaging the first and the second rails; and a second roller journally connected to the upper carriage frame generally near the rearward end of the upper carriage frame and rollingly engaging the first and the second rails; and wherein the lower carriage frame is defined further as being generally rectangularly shaped and having a forward end and a rearward end, and wherein the lower roller assembly is defined further to include:

- a first roller journally connected to the lower carriage frame generally near the forward end of the lower carriage frame and rollingly engaging the first and the second rails; and
- a second roller journally connected to the lower carriage frame generally near the rearward end of the lower carriage frame and rollingly engaging the first and the second rails.

17. The animal holding chute of claim 16 wherein the first roller on the upper carriage frame is generally aligned with the first roller on the lower carriage frame, and wherein the second roller on the upper carriage frame is generally aligned with the second roller on the lower carriage frame.

18. The animal holding chute of claim 15 wherein the carriage is defined further to include:

means connecting the upper carriage frame to the lower carriage frame.

19. The animal holding chute of claim 1 wherein the gate track assembly is defined further to include:

- a first rail connected to the first side frame generally near the upper end of the first side frame, a plurality of teeth being formed on the first rail with said teeth being spaced along a length of the first rail extending generally between the opposite ends of the first rail; and
- a second rail connected to the second side frame generally near the upper end of the second side frame, a plurality of teeth being formed on the second rail with said teeth being spaced along a length of the second rail extending generally between the opposite ends of the second rail; and wherein the gate support is defined further to include:

- a carriage blade having a connecting end pivotally connected to the carriage and an opposite blade end engagable with the teeth on the first and the second rails, the carriage blade being positioned and the teeth on the first and second rails being oriented so that the blade end of the carriage blade removably engages the teeth on the first and the second rails as the carriage is being moved from the start position to the animal holding position and the carriage blade being positioned and the teeth on the first and the second rails being oriented so the blade end of the carriage blade engages the teeth on the first and the second rails for preventing movement of the carriage in a direction from the animal holding position toward the start position to secure the carriage and the entrance gate in the animal holding position.

20. The animal holding chute of claim 19 wherein the gate support is defined further to include:

means for pivotally moving the carriage blade to disengage the carriage blade from the teeth on the first and second rails so the carriage and the entrance gate connected thereto are movable in the direction from the animal holding position to the start position.

21. The animal holding chute of claim 20 wherein at least one of the first and the second rails includes an upper surface and wherein the gate support is defined further to include:

- a release arm having a portion connected to the carriage blade;
- a cam having a portion connected to the release arm, the release arm extending a distance from the cam, the cam having a cam surface extending about a portion of the outer periphery of the cam and the cam being disposed so that the cam surface engages a portion of the upper surface of one of the first and the second rails, the cam surface being shaped so that when the release arm is moved one portion of the cam surface engages the upper surface of one of the first and the second rails to pivotally move the carriage blade to disengage the carriage blade from the teeth on the first and the second rails so the carriage and the entrance gate connected thereto are movable in the direction from the animal holding position to the start position and so that when the release arm is moved another portion of the cam surface engages the upper surface of one of the first and the second rails for pivotally moving the carriage blade to a position wherein the carriage blade engages the teeth on the first and the second rails.

22. The animal holding chute of claim 21 wherein the release arm is positioned and shaped to be grippable by an individual for manually moving the release arm.

23. The animal holding chute of claim 19 wherein the means for moving the carriage is defined further to include:

an arm assembly having a carriage engaging end and an opposite actuating end, the carriage engaging end being engagable with the carriage and the actuating end being engagable for moving the arm assembly in an actuating direction and for moving the arm assembly in an opposite releasing direction, the carriage engaging end engaging a portion of the carriage and moving the carriage generally from the stop position toward the animal holding position as the arm assembly moves in the actuating direction.

24. The animal holding chute of claim 23 wherein the carriage is defined further to include:

a carriage moving track connected to the carriage and extending a distance generally between the forward ends and the rearward ends of the first and the second side frame, the carriage moving track being engagable by the carriage engaging end of the arm assembly for moving the carriage moving track and the carriage connected thereto from the start position toward the animal holding position.

25. The animal holding chute of claim 24 wherein the carriage moving track is defined further as including a plurality of teeth and wherein the arm assembly is defined further to include an arm blade forming the carriage engaging end of the arm assembly, the arm blade having a blade end engagable with the teeth for cooperating in moving the carriage from the start position to the animal holding position.

26. The animal holding chute of claim 25 wherein the arm assembly is defined further to include:

a first arm having a first end and a second end with the first end of the first arm forming the engaging end of the arm assembly and the second end of the first arm being disposed generally near the rearward end and generally near the lower end of the second side frame, the first arm extending a distance generally from the rearward end toward the forward end of the second side frame terminating with the first end of the first arm;

a second arm having a first end and a second end with the second end of the second arm being connected to the second end of the first arm and the second arm extending a distance at an angle from the first arm in a direction generally from the lower end of the second side frame toward the upper end of the second side frame; and means pivotally supporting the first and the second arms generally at the connection between the second ends of the first and the second arms for pivotal movement of the first and the second arms in the actuating and releasing directions; and wherein the arm blade is defined further as having a portion thereof pivotally connected to the first end of the second arm.

27. The animal holding chute of claim 26 wherein the support is defined further to include:

a cable having opposite ends, the cable being movably connected to the forward end of the second side frame and extending from the forward end of the second side frame toward the rearward end of the second side frame and extending back from the rearward end of the second side frame toward the forward end of the second side frame terminating with the opposite end of the cable which is connected to the carriage, a portion of the cable being movably connected to the arm blade and a portion of the cable being movably connected to the carriage blade, the end of the cable opposite the end of the cable which is connected to the carriage being disposed near the forward end of the second side frame so that when this end of the cable is pulled the arm blade is pivoted from engagement with the carriage moving track and the carriage blade is pivoted from engagement with the teeth on the first and the second rails thereby permitting the carriage to be pulled by the cable from the animal holding position to the start position.

28. The animal holding chute of claim 1 wherein the gate track assembly is defined further to include:

a first rail having an upper surface, a lower surface and an inside surface disposed generally between the upper and the lower surfaces, the first rail being connected to the first side frame generally near the upper end of the first side frame, the first rail extending a distance generally between the rearward end and the forward end of the first side frame; and a second rail having an upper surface, a lower surface and an inside surface disposed generally between the upper and the lower surfaces, the second rail being connected to the second frame generally near the upper end of the second frame and the second rail extending a distance generally between the rearward end and the forward end of the second side frame and generally parallel and aligned with the first rail, the inside surface of the second rail generally facing and being spaced a distance from the inside surface of the first rail; and wherein the carriage is defined further to include:

an upper carriage frame disposed generally above the first and the second rails;

an upper roller assembly journally connected to the upper carriage frame and having portions rollingly engaging the upper surfaces of the first and the second rails; and means connected to the upper carriage frame for rollingly engaging the inside surfaces of the first and the second rails for cooperating with the upper roller assembly to rollingly support the entrance gate on the first and the second rails.

29. The animal holding chute of claim 28 wherein the carriage is defined further to include:

a lower carriage frame disposed generally below the first and the second rails, the lower carriage frame being aligned with the upper carriage frame and being connected to the upper carriage frame; and a lower roller assembly journally connected to the lower carriage frame and having portions rollingly engaging the upper surfaces of the first and the second rails, the lower roller assembly cooperating with the upper roller assembly and the means rollingly engaging the inside surfaces of the first and the second rails to rollingly support the entrance gate on the first and the second rails.

30. The animal holding chute of claim 29 wherein the upper carriage frame is defined further as having a forward and a rearward end, and wherein the upper roller assembly is defined further to include:

a roller journally connected to the upper carriage frame generally near the forward end of the upper carriage frame and rollingly engaging the upper surface of the first rail;

a roller journally connected to the upper carriage frame generally near the forward end of the upper carriage frame and rollingly engaging the upper surface of the second rail;

a roller journally connected to the upper carriage frame generally near the rearward end of the upper carriage frame and rollingly engaging the upper surface of the first rail; and a roller journally connected to the upper carriage frame generally near the rearward end of the upper carriage frame and rollingly engaging the upper surface of the second rail; and wherein the lower carriage frame is defined further as having a forward end and a rearward end, and wherein the lower roller assembly is defined further to include:

a roller journally connected to the lower carriage frame generally near the forward end of the lower carriage frame and rollingly engaging the lower surface of the first rail;

a roller journally connected to the lower carriage frame generally near the forward end of the lower carriage frame and rollingly engaging the lower surface of the second rail;

a roller journally connected to the lower carriage frame generally near the rearward end of the lower carriage frame and rollingly engaging the lower surface of the first rail; and a roller journally connected to the lower carriage frame generally near the rearward end of the lower carriage frame and rollingly engaging the lower surface of the second rail.

31. The animal holding chute of claim 30 defined further to include:

an auxillary roller journally connected to the upper carriage generally near the forward end of the upper carriage and positioned to rollingly engage the inside surface of the first rail;

an auxillary roller journally connected to the upper carriage generally near the forward end of the upper carriage and positioned to rollingly engage the inside surface of the second rail;

an auxillary roller journally connected to the upper carriage generally near the rearward end of the upper carriage and positioned to rollingly engage the inside surface of the first rail; and an auxillary roller journally connected to the upper carriage generally near the rearward end of the upper carriage and positioned to rollingly engage the inside surface of the second rail.

32. The animal holding chute of claim 21 wherein the upper carriage frame is defined further to include:

a first axle having opposite ends and extending generally between the first and the second rails and being disposed generally above the first and the second rails, the roller positioned near the forward end of the carriage and rollingly engaging the upper surface of the first rail being journally connected to one end of the first axle and the roller positioned near the forward end of the carriage and rollingly engaging the upper surface of the second rail being journally connected to the opposite end of the first axle; and a second axle extending generally between the first and the second rails and being disposed generally above the first and the second rails, the roller positioned near the rearward end of the carriage and rollingly engaging the upper surface of the first rail being journally connected to one end of the second axle and the roller positioned near the rearward end of the carriage and rollingly engaging the upper surface of the second rail being journally connected to the opposite end of the carriage.

33. The animal holding chute of claim 32 wherein the lower carriage is defined further to include:

a first axle having opposite ends and extending generally between the first and the second rails and being disposed generally below the first and the second rails, the roller positioned near the forward end of the carriage and rollingly engaging the lower surface of the first rail being journally connected to one end of the first axle and the roller positioned near the forward end of the carriage and rollingly engaging the lower surface of the second rail being journally connected to the opposite end of the first axle; and a second axle extending generally between the first and the second rails and being disposed generally below the first and the second rails, the roller positioned near the rearward end of the carriage and rollingly enaging the lower surface of the first rail being journally connected to one end of the second axle and the roller positioned near the rearward end of the carriage and rollingly engaging the lower surface of the second rail being journally connected to the opposite end of the carriage.

* * * * *

UNITED STATES PATENT AND TRADEMARK OFFICE
CERTIFICATE OF CORRECTION

PATENT NO. :    4,531,478

DATED      :    July 30, 1985

INVENTOR(S) :   William J. Forrest

It is certified that error appears in the above-identified patent and that said Letters Patent is hereby corrected as shown below:

Column 23, line 17, please place the word --gate-- before the word "support".

Signed and Sealed this

Fifteenth Day of October 1985

[SEAL]

Attest:

Attesting Officer

DONALD J. QUIGG

Commissioner of Patents and Trademarks—Designate